United States Patent [19]

Harris

[11] Patent Number: 5,475,524

[45] Date of Patent: Dec. 12, 1995

[54] OPTICS FOR PASSIVE FACET TRACKING AND PASSIVE SCAN ANGLE DOUBLING

[75] Inventor: Ellis D. Harris, Claremont, Calif.

[73] Assignee: Xerox Corporation, Stamford, Conn.

[21] Appl. No.: 358,501

[22] Filed: Dec. 19, 1994

[51] Int. Cl.$^6$ .................................................. G02B 26/08
[52] U.S. Cl. .......................... 359/216; 359/208; 359/217; 347/259; 347/261
[58] Field of Search .................................... 359/201–203, 359/205–208, 216–219; 347/258–261; 346/107.1; 348/203, 205; 358/296, 474; 250/234–236

[56] References Cited

U.S. PATENT DOCUMENTS

| | | | |
|---|---|---|---|
| 3,973,826 | 8/1976 | Lobb | 359/217 |
| 5,343,326 | 8/1994 | Ossman et al. | 359/216 |

*Primary Examiner*—James Phan
*Attorney, Agent, or Firm*—Nola Mae McBain

[57] ABSTRACT

A passive facet tracking scan angle doubling system using passive optical components to induce a beam of light to track a facet of a rotating mirror polygon and to increase the scanning angle available from a rotating mirror polygon of a given size. The passive facet tracking portion of the system using passive optical components to induce a beam of light to track a facet of a rotating mirror polygon. The properties of the passive components are such that they collimate a light beam in a tangential plane in a complete trip through the passive optical components and the passive optical components focus the beam in the sagittal plane so that the beam is collimated in the tangential plane and focussed in the sagittal plane when it arrives at the center of the flat facet. The scan angle doubling portion of the system using a rotating mirror polygon, a cylinder mirror, and a lens to increase the scanning angle available from a rotating mirror polygon of a given size. The properties of the passive components are such that the output light beam from the rotating mirror polygon is collimated and normal to the rotating mirror polygon. The polygon, cylinder mirror, and lens are arranged such that the rotating polygon and the cylinder mirror are opposed to each other and separated by a distance greater than the sum of the radius of curvature of the cylinder mirror plus the focal length of the lens, and the lens is interposed between the rotating polygon and the cylinder mirror so that the center of the radius of curvature of the cylinder mirror and the focal point of the lens are coincident.

16 Claims, 15 Drawing Sheets

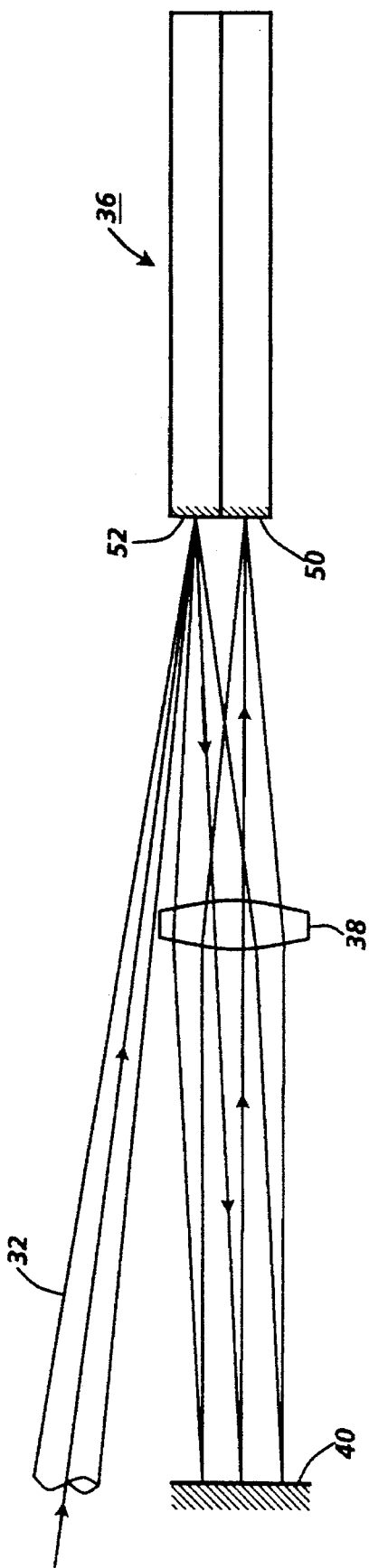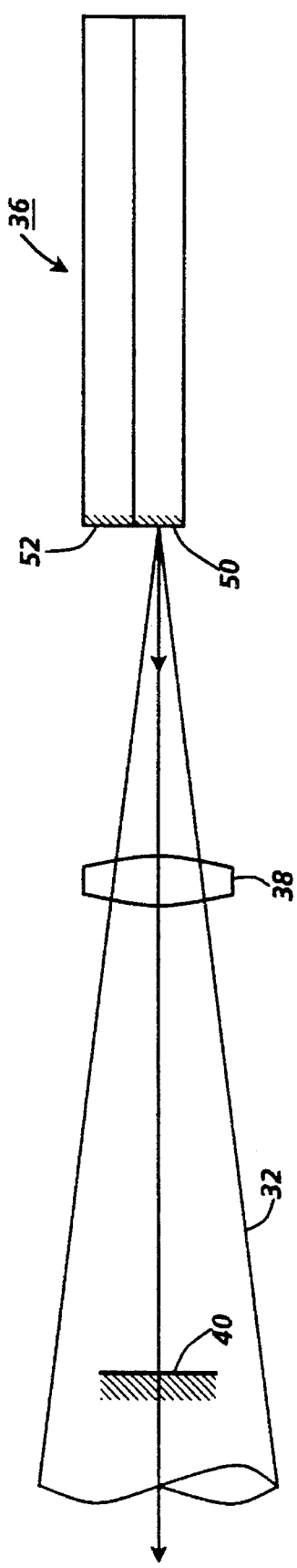
FIG. 6
FIG. 7

OPTICS FOR PASSIVE FACET TRACKING AND PASSIVE SCAN ANGLE DOUBLING

BACKGROUND

This invention relates to scanning devices employing a rotatable mirror device such as those used in laser printing devices and specifically to facet tracking devices. FIG. 1 shows a typical laser printing device utilizing a rotating mirror for scanning. A laser 10 emits a beam 12 towards pre-polygon optics 14. After passing through the pre-polygon optics 14, the beam 12 falls on a scanner 16. The scanner 16 is a rotating polygon with flat reflecting facets 18. As the scanner 16 rotates, the beam 12 is scanned along a scan line on a photoreceptor 22. The direction along the scan line 20 is the tangential plane and the direction perpendicular to the scan line on the photoreceptor 22 is the sagittal plane.

Scanner performance is determined by the physical limitations on the speed at which the mirror is rotated, by the angular deflection of the laser beam achieved by reflection from a facet from the rotating polygon, the number of facets, the size of the facets, and the width of the beam being scanned where it is incident on the rotating mirror.

The beam width impacts the scanning speed because it determines the minimum facet size of a facet on the rotating mirror. A larger facet means a larger rotating polygon and hence larger, more costly motor polygon assemblies with higher power motors and slower scanning speeds. Scanning speeds, for a given beam width, can be increased by the use of facet tracking devices because they allow a smaller facet to be used and therefore smaller rotating mirrors which can be rotated faster.

One method for increasing scanning speeds is the use of angle doubling with small sized polygon assemblies having a large number of small sized facets. For an "F-THETA" scan lens, commonly employed in laser scanners, the scanned distance on the photoreceptor is the product of the scan angel (THETA) and the effective focal length (F). Whenever the scan angle can be increased, the effective focal length can be decreased for a given scan length. A decrease in effective focal length brings two primary advantages. Firstly, the smaller focal length translates directly into a smaller physical casting or base upon which the optical components are mounted. Glass lens elements, mirrors and all other components can be smaller. The end result is a smaller, lighter, less costly product. Secondarily, the shorter focal length requires a smaller beam at the rotating polygon, further reducing the sizes of optical and mechanical components.

A further advantage results from scan angle doubling in that any given scan distance along the photoreceptor can be achieved with only half the polygon angular rotation. By this means, the polygon speed of rotation is significantly reduced, allowing lighter, smaller and less costly motor bearings as well as better bearing lifetime and overall performance.

Facet tracking and angle doubling devices are known and have been described as in U.S. Pat. No. 3,973,826 by Lobb which describes a device for passive facet tracking and angle doubling. Lobb describes a system utilizing a prescanner which, as it rotates with the scanner, produces a variable deflection in the scanned beam so that during a scan period, the beam moves at the speed of a scanner and in the same direction. The prescanner, by slightly deflecting the beam at the speed of the scanner and in the same direction, maintains the position of the beam centered in the scanning facet. Specifically, a beam, which is focused on a prescanner, is reflected off the prescanner to a concave mirror which causes the beam to converge but not focus, on a facet of the scanner. The prescanner is built using cylindrical or curved facets and the scanner is built using flat facets.

Lobb also describes two scan angle doubling configurations. The first comprises a rotating mirror which reflects light into a static optical system. The static optical system reflects the received light back onto the rotating mirror. The static optical system is comprised of a single system consisting of a roof prism and a field lens or a plurality of static optical systems arranged in an arc in the scanning area, each system comprising a roof prism and a field lens.

In the Lobb patent, the beam is not collimated at the scanner facet in the scanning plane, thus any variation in radius between the facets will translate into scanning errors on the scanning plane. In a laser printing application, these scanning errors show up as pixel placement errors visible on a printed page. When the scanned beam is collimated in the scanned plane at the scanner facet, polygon manufacturing tolerances can be relaxed with resultant cost savings.

In the Lobb patent, the beam is not focused on the scanner facet in the sagittal plane. As a consequence, pyramidal errors in the scanner facet and bearing wobble can not be compensated but will result in variable spacing between scan lines. In a laser printing application, these errors show up on the printed page as differences in spacing between the printed lines. Even very small differences are apparent, producing unacceptable output quality. When the beam is focused on the scanner facet in the sagittal plane, pyramidal errors may be optically removed by focussing both the beam and the facet onto the scan line in the sagittal plane. Again, this allows polygon manufacturing tolerances to be relaxed with resultant cost savings and no loss in print quality.

The present invention uses anamorphic optics to collimate the beam in the tangential plane at the scanning facet and to focus the beam in the sagittal plane at the scanning facet so that errors produced by radial and pyramidal variations of the scanning facets may be substantially reduced or easily corrected to provide for improved scanning.

Further advantages of the invention will become apparent as the following description proceeds.

SUMMARY OF THE INVENTION

Briefly stated, and in accordance with the present invention, there is provided a passive facet tracking scan angle doubling system using passive optical components to induce a beam of light to track a facet of a rotating mirror polygon and to increase the scanning angle available from a rotating mirror polygon of a given size. The properties of the passive components are such that the output light beam from the rotating mirror polygon is focussed at the facet in the sagittal plane, collimated in the tangential plane, and normal to the rotation asix of the mirror polygon.

BRIEF DESCRIPTION OF THE DRAWINGS

FIG. 6 shows a sagittal plane layout of the passive facet tracking system shown in FIG. 2.

FIG. 7 shows a partial sagittal plane layout of the passive facet tracking system shown in FIG. 2.

While the present invention will be described in connection with a preferred embodiment and method of use, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
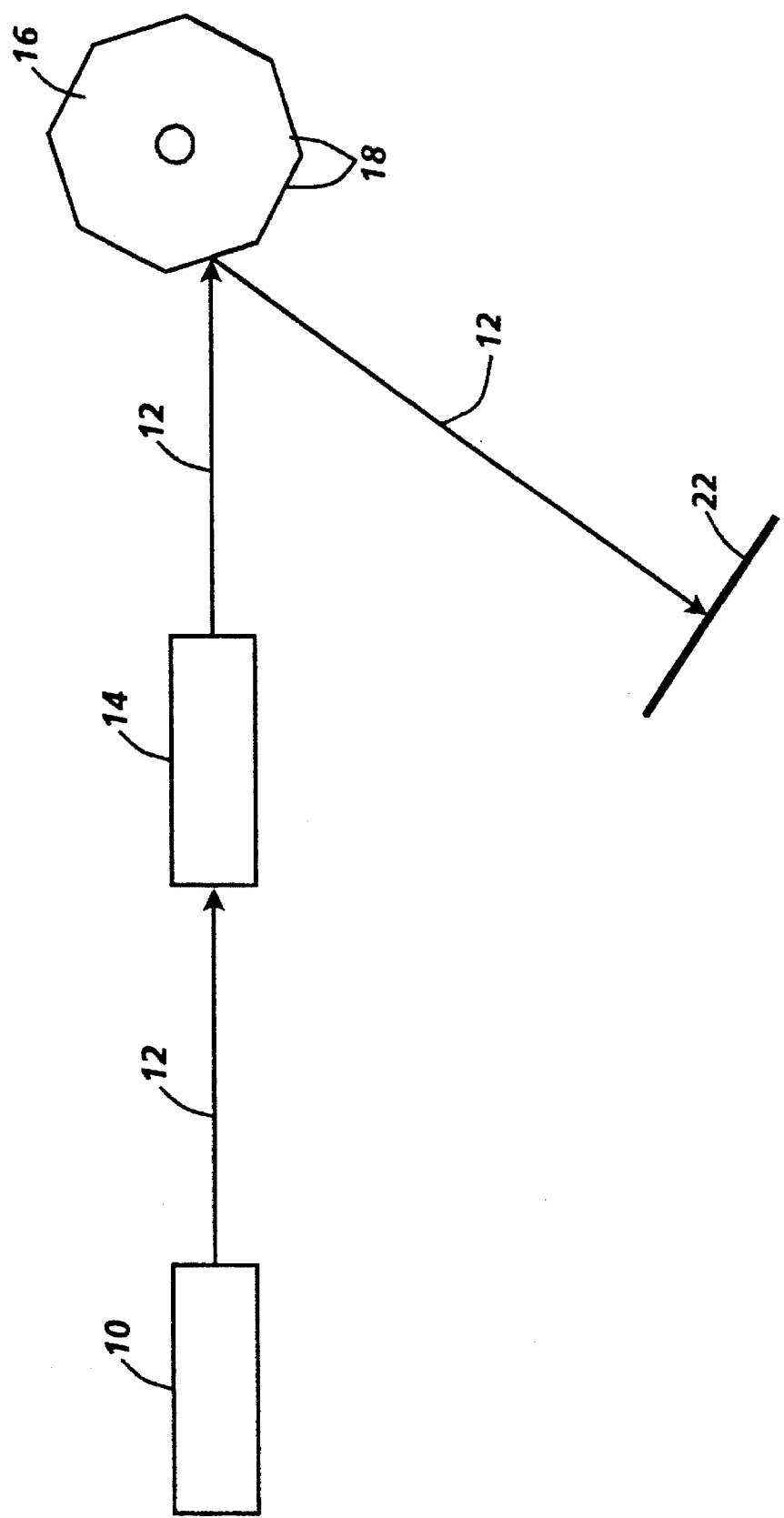
FIG. 1 shows a typical laser printing device utilizing a rotating polygon mirror for scanning.
Figure 2:
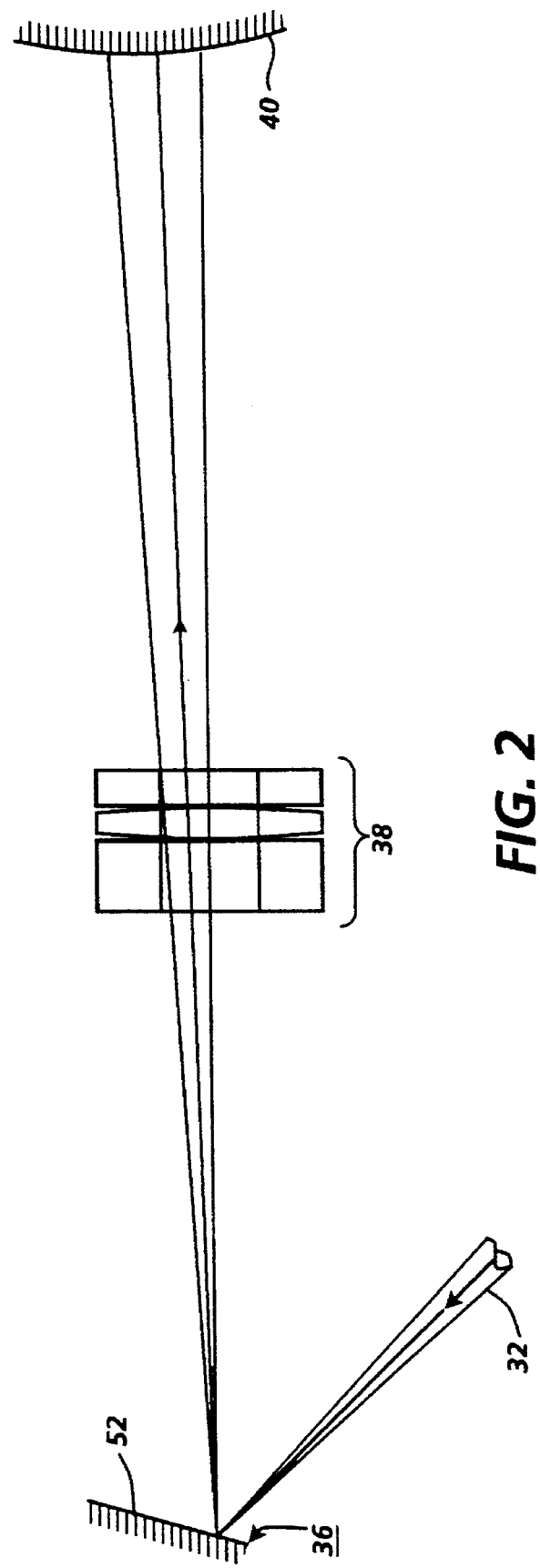
FIG. 2 shows a partial tangential plane layout of a passive facet tracking system according to the present invention.

Turning now to FIG. 2, a tangential plane layout of a passive facet tracking system is shown. A beam 32 is directed towards and focussed on a dual mirror motor polygon assembly 36. The dual mirror motor polygon assembly 36 is shown in a perspective view in FIG. 4. The dual mirror motor polygon assembly 36 reflects the beam 32 through passive facet tracking optics 38 to a plane mirror 40 (FIG. 2).

Figure 3:
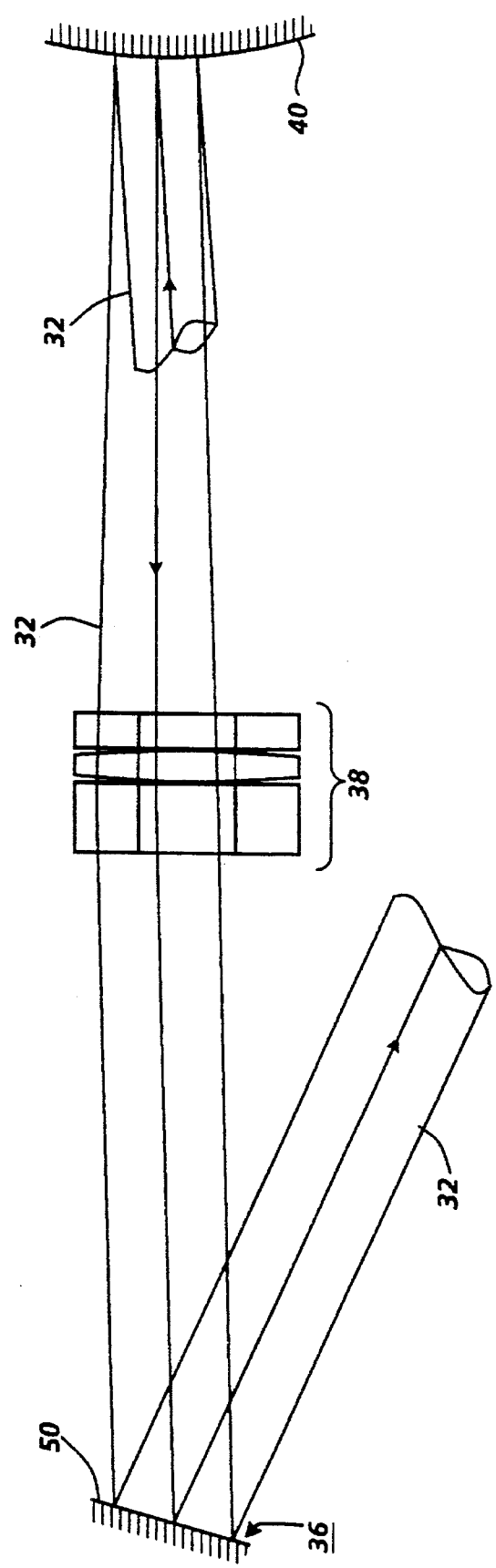
FIG. 3 shows a continuation of the tangential plane layout of the passive facet tracking system shown in FIG. 2.

As shown in FIG. 3, the plane mirror 40 reflects the beam 32 back through the passive facet tracking optics 38 to the dual mirror motor polygon assembly 36. The dual mirror motor polygon assembly 36 then reflects the beam 32 out towards post scanning optics and a photoreceptor (not shown).

Figure 4:
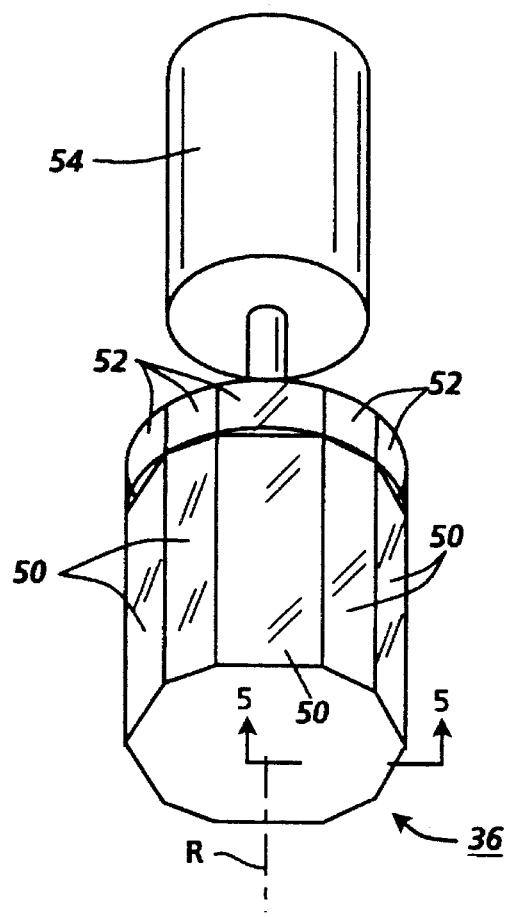
FIG. 4 shows a dual mirror motor polygon assembly in a perspective view.
Figure 5:
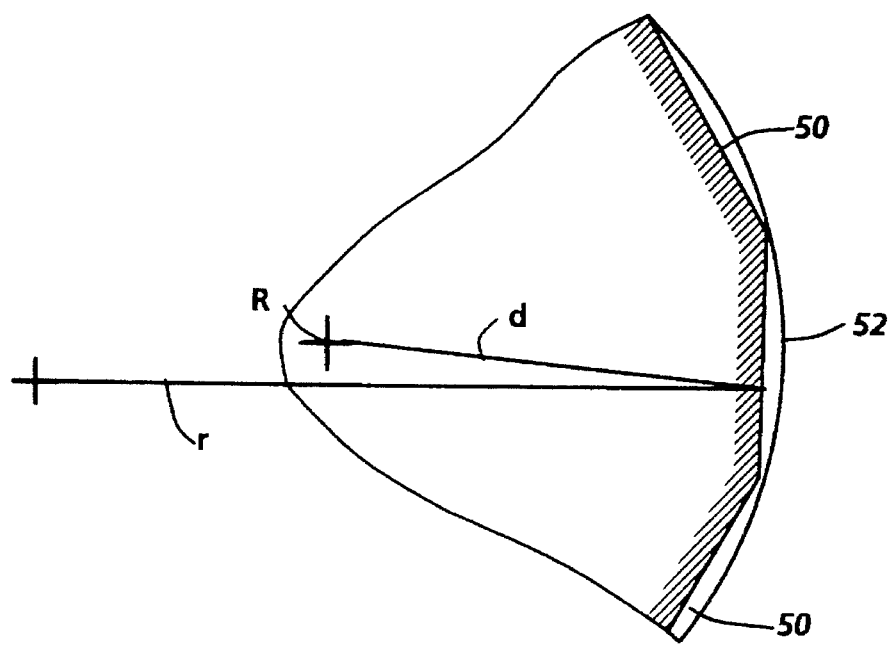
FIG. 5 shows a partial cross-sectional view of the dual mirror motor polygon assembly shown in FIG. 4.

The dual mirror motor polygon assembly 36 is shown in a perspective view in FIG. 4 and includes flat facets 50, convex facets 52 and is rotated along axis R by its motor 54. Axis R is the center of the polygon 56 and is located a distance d from the center of each flat facet 50. The convex facets 52 are curved facets, each convex facet 52 with a radius r just slightly larger than distance d of the polygon 56 as is shown in FIG. 5.

The passive facet tracking optics 38 are designed to provide different functions in the sagittal and tangential planes. These different functions are illustrated in FIGS. 2, 3, 6 and 7. In the tangential plane, the laser beam is focussed upon the convex facet 52 (FIG. 2). Upon reflection, the laser beam transits through the facet tracking optics 38, is reflected by mirror 40 and retraces its path making a second transit of the facet tracking optics 38 and finally impacts the flat facet 50. Over this total round trip, the beam 32 becomes collimated by the facet tracking optics 38 (FIG. 3). This collimated beam tracks the flat facet 50, as it rotates to provide a scan of one line.

In the sagittal plane, the laser beam 32 is not focussed but is collimated, as shown in FIG. 6, as it arrives at the convex facet 52. Over the round trip from the convex facet 52 and including the facet tracking optics 38 and mirror 40, the laser beam 32 becomes focussed when it arrives at flat facet 50. Mirror 40 is tilted slightly in the sagittal plane to allow the laser beam 32 to deflect to the flat facet 50 upon its return to the motor polygon assembly 36.

Figure 8:
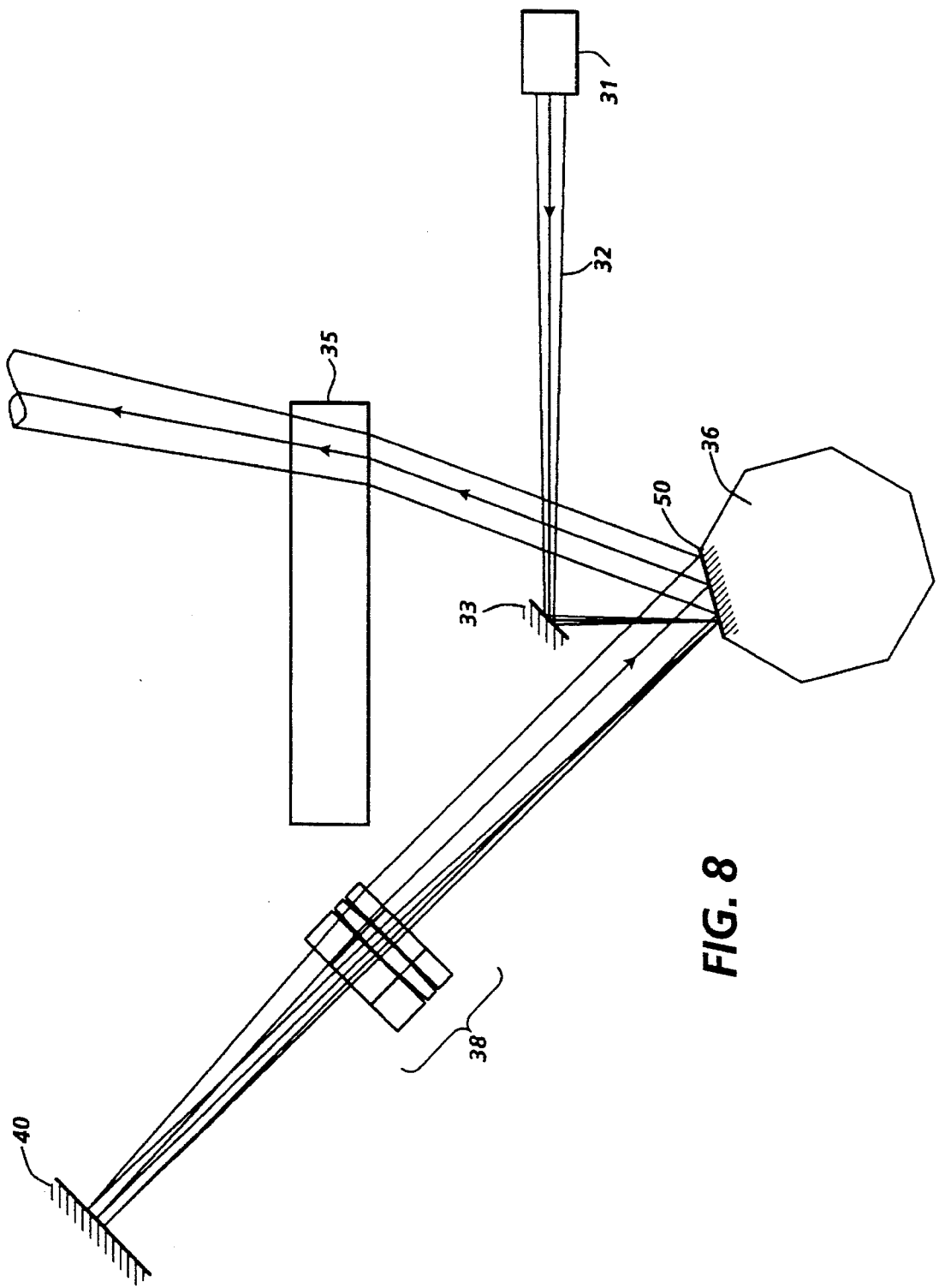
FIG. 8 shows the passive facet tracking system shown in FIG. 2 used in a laser scanning sytem.

FIG. 8 shows the facet tracking system used in a laser scanning system including a light source 31 and fold mirror 33 to direct the beam 32 to the dual mirror motor polygon assembly 36. It is from the flat facets 50 of the dual mirror motor polygon assembly 36 that the beam 32 is reflected to post scanning optics 35. With the beam 32 focussed onto the flat facet 50 in the sagittal plane, it is possible to include standard wobble correction optics in the post scanning optics which allows for a relaxation of pyramidal polygon and bearing wobble manufacturing tolerances. Additionally the beam 32 returns to the dual mirror motor polygon assembly 36 at an angle that is normal to the flat facets 50 in the sagittal plane. As the beam 32 is scanned by the dual mirror motor polygon assembly 36 it remains in this normal plane, essentially preventing scan line bow.

In the tangential plane, the laser beam 32 is collimated at the flat facet 50. The collimation of the laser beam in the tangential plane allows a relaxation of polygon radius variations between individual facets.

The facet tracking optics 38 are a triplet anamorphic lens element and the the mirror 40 is a curved cylinder mirror with curvature in the tangential plane. The facet tracking optics 38 include a single curved surface and is located optically midway between the facets 50, 52 and the mirror 40, resulting in a completely symmetric design. In the tangential Iplane, if a beam is in focus at either one of the facets, either curved or flat, it will be collimated at the other. Thus the focussed beam in the tangential plane at the convex facet 52 will return as a collimated beam at the flat facet 50.

Figure 9:
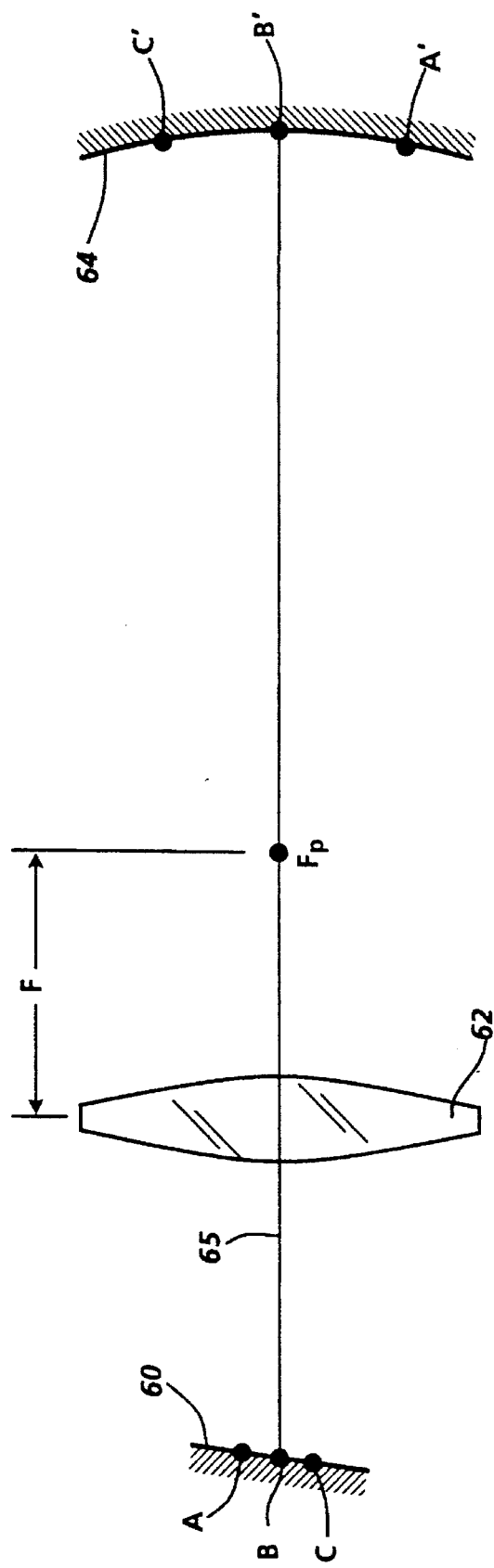
FIG. 9 shows a tangential view of a passive scan angle doubling device according to the present invention.

FIG. 9 shows a tangential view of a passive scan angle doubling device according to the present invention. A flat facet 60 of a rotating polygon assembly is shown with three points A,B,C marked on it. A cylinder mirror 64 is shown with conjugate points A', B', C' marked on it. A lens 62 with a focal length F is disposed between the flat facet 60 and the cylinder mirror 64. The center of radius of curvature of the cylinder mirror 64 is coincident with back focal point Fp of the lens 62. The flat facet 60 is focussed on the cylinder mirror 64 by the lens 62. The cylinder mirror 64 is normal to optic axis line B—B'. These properties of the arrangement of the flat facet 60, the lens 62 and the cylinder mirror 64 will be used to provide scan angle doubling.

Figure 10:
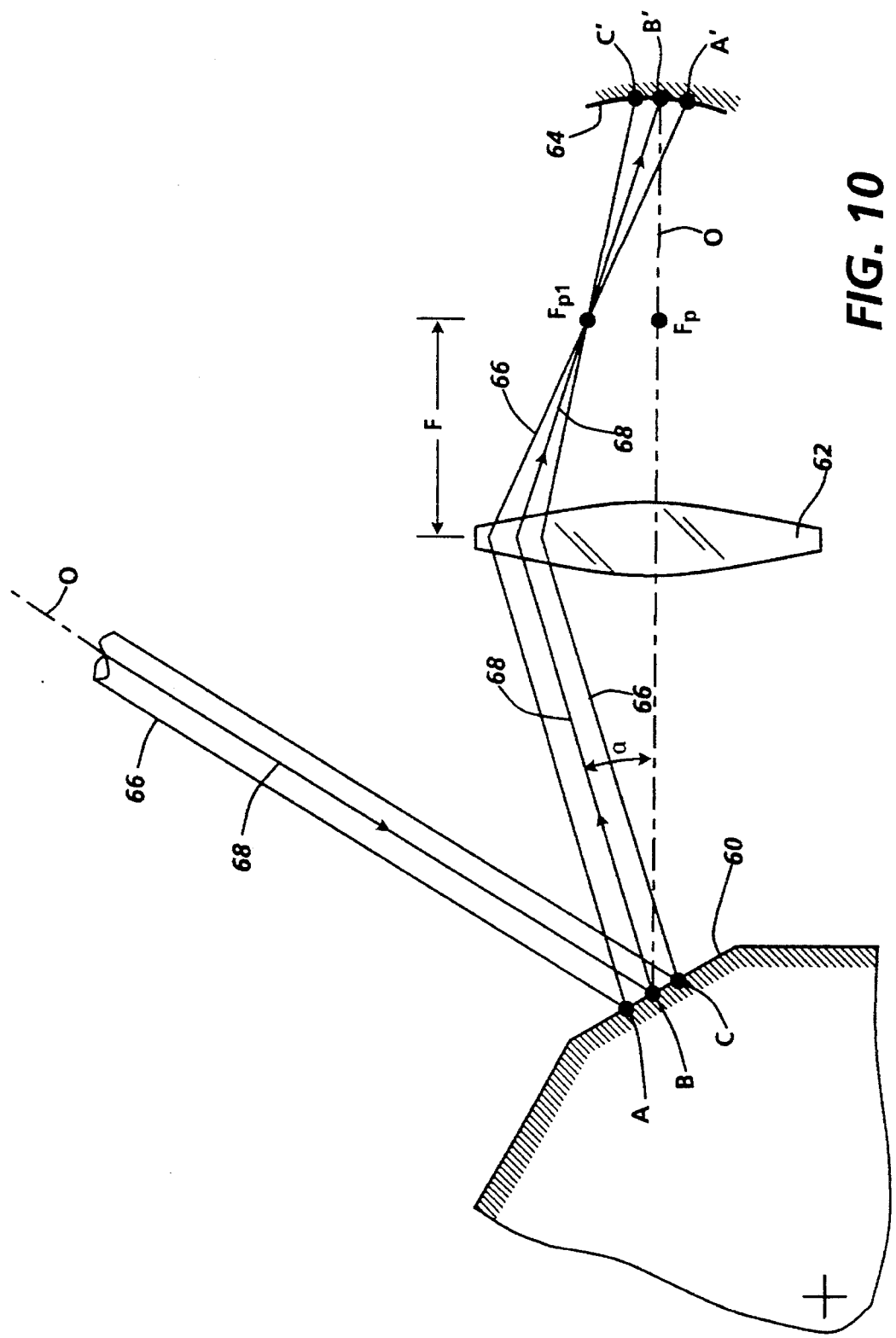
FIG. 10 shows the same assembly shown in FIG. 9 after partial propagation of a light beam.

FIG. 10 shows the same assembly shown in FIG. 9. A light beam 66 is reflected by the flat facet 60 with the angle of reflection determined by the angle of rotation of the flat facet 60. Angles of reflection will be measured from optic axis O of the system. Optic axis O is a line which corresponds to a path taken by the light beam 66 when the system is in a center of scan position. When the system is in the center of scan position, the light beam 66 is reflected by the flat facet 60 through the lens 62 along line O to the cylinder mirror 64. The light beam 66 is then reflected by the cylinder mirror 64 and retraces its path exactly back through the lens 62 to be reflected by the flat facet 60 back along its entry path. The incident light beam 66 is collimated in this tangential plane. Upon reflection, the light beam 66 is reflected by an angle α (a relative difference) becoming reflected beam 66. The reflected angle α results from a polygon rotation angle of α/2.

The reflected beam 66, including chief ray 68, passes through the lens 62 and is brought to a focus at a focus point $f_{P_1}$ following which it expands and is incident upon the cylinder mirror 64. Because the light beam 66 is reflected from points on the flat facet 60 to the conjugate points on the cylinder mirror 64, the parts of the light beam 66 which are reflected from point A are reflected to point A' on the cylinder mirror 64, the parts of the light beam 66 reflected from point B are reflected to point B' (this is the chief ray 68), and the parts of light beam 66 reflected from point C are reflected to point C'.

Figure 11:
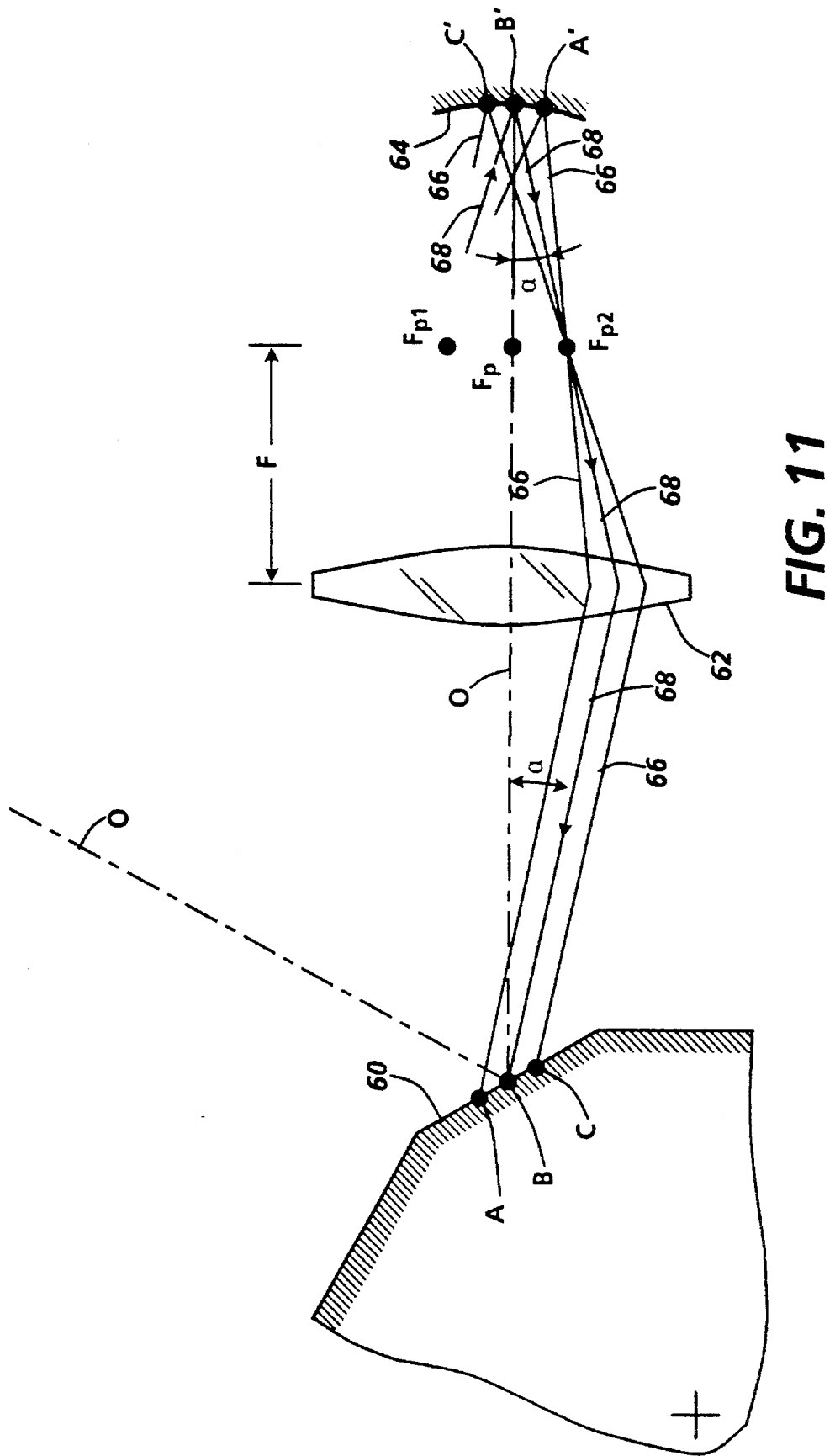
FIG. 11 shows the same assembly shown in FIG. 10 after further propagation of the light beam.

FIG. 11 shows the same assembly shown in FIGS. 9 and 10 after the light beam 66 is reflected from the cylinder mirror 64 and returns to the facet 60 through a path including focal point $f_{p2}$ and lens 62. At the facet 60 the light beam 66 is reflected in a direction which adds to the total deflected angle β which is equal to 2α. If the light beam 66 were to simply retrace its path, returning by way of focal point $f_{p1}$, two angular deflections from the flat facet 60 would subtract and cancel each other out. The laser beam would simply return to its source through a path including prepolygon optics 14. The fact that light beam 66 is reflected by the same angle but in the opposite direction dictates that the two angular deviations caused by the two reflections from the facet will add.

Therefore, the beams of the light beam 66 are reflected from the conjugate points A', B' and C' and returned to a focus at focus point $f_{P2}$. Notice that focus point $f_{P1}$ and focus point $f_{P2}$ are displaced from each other symmetrically about the optic axis B—B'. The displacement is determined by the reflected angle α of the light beam 66 when it is reflected from the flat facet 60. The light beam 66 then passes through the lens 62 and results in a collimated ray bundle striking the flat facet 60 at an angle β, equal to twice the single reflection angle α. The resultant angle of reflection β is four times the angle of polygon rotation which is α/2.

Figure 12:
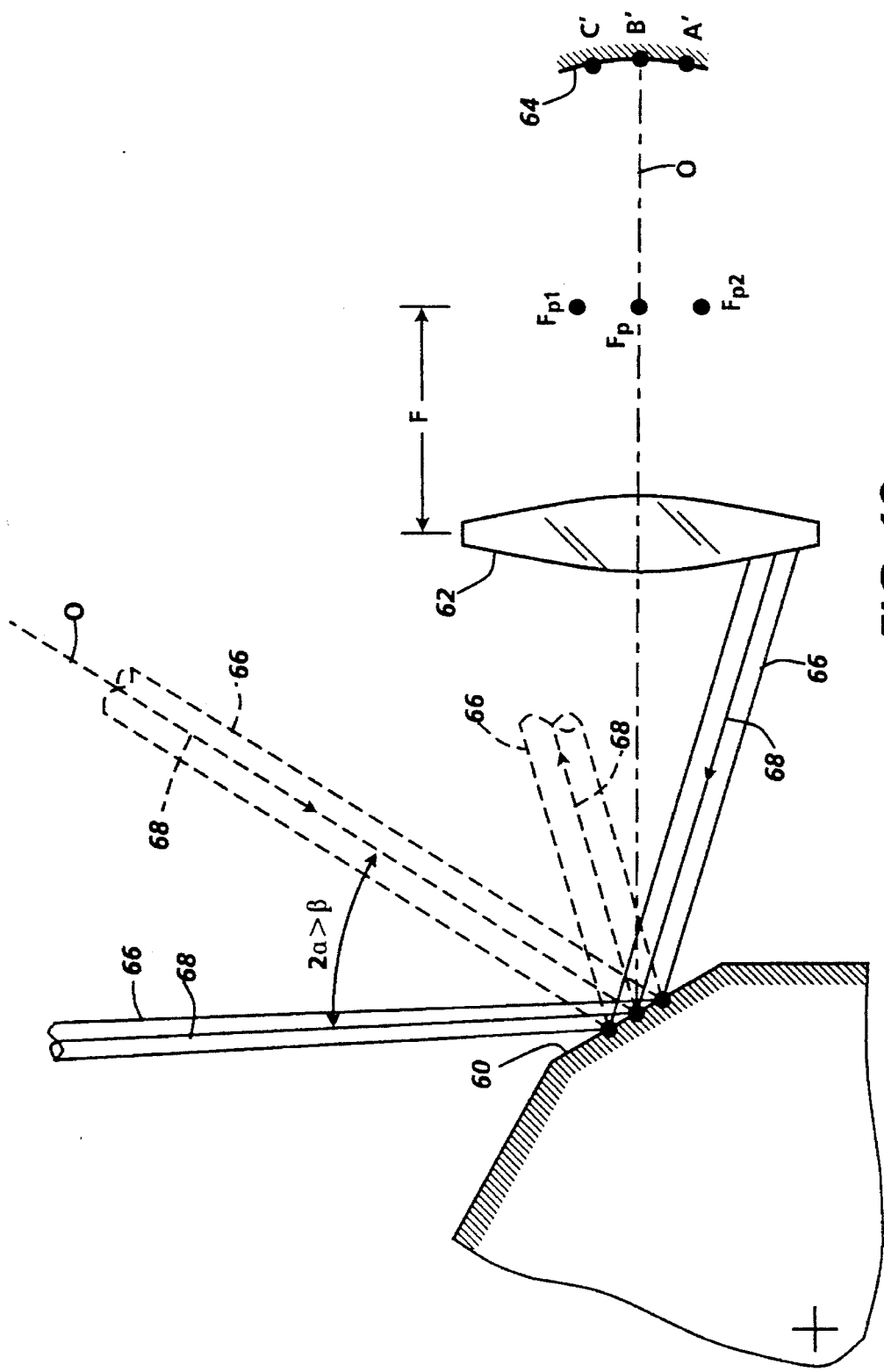
FIG. 12 shows the same assembly shown in FIG. 11 after further propagation of the light beam.

FIG. 12 shows the same assembly shown in FIGS. 9–11 after the collimated ray bundle forming the light beam 66 is reflected a second time from the flat facet 60. The reflected light beam 66 is reflected at an angle β which is twice angle α, the angle of the first reflection from the flat facet 60 (earlier reflection shown in dotted lines). The light beam 66 now exits the assembly. The light beam 66, which was focussed at focal point $f_{p2}$, is collimated by lens 62 in the tangential plane. Tangential plane collimation at the polygon is thus preserved by the passive scan angle doubling optics.

This method of scan angle doubling is not limited to two reflections from the flat facet 60. The light beam 66 can make several round trips between the flat facet 60 and the cylinder mirror 64. Each time the light beam 66 returns to the flat facet 60 to be reflected, it will be reflected by an additional amount equal to twice angle α or angel β. This would result in scan angle multiplication of the original beam angle.

Figure 13:
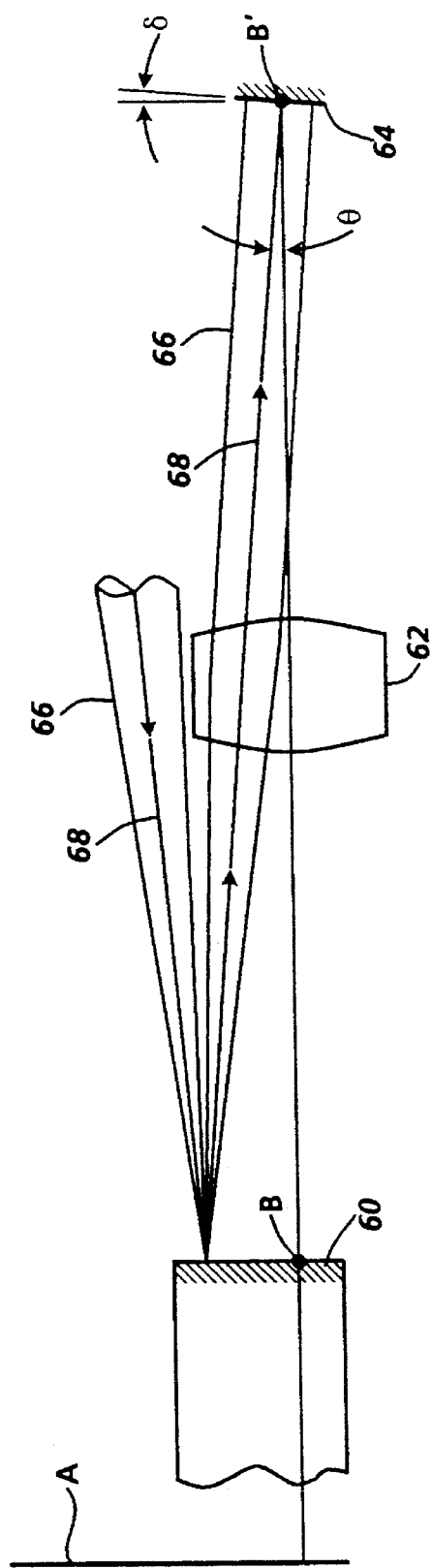
FIG. 13 shows a sagittal view of a passive scan angle doubling device after partial propagation of a light beam.
Figure 14:
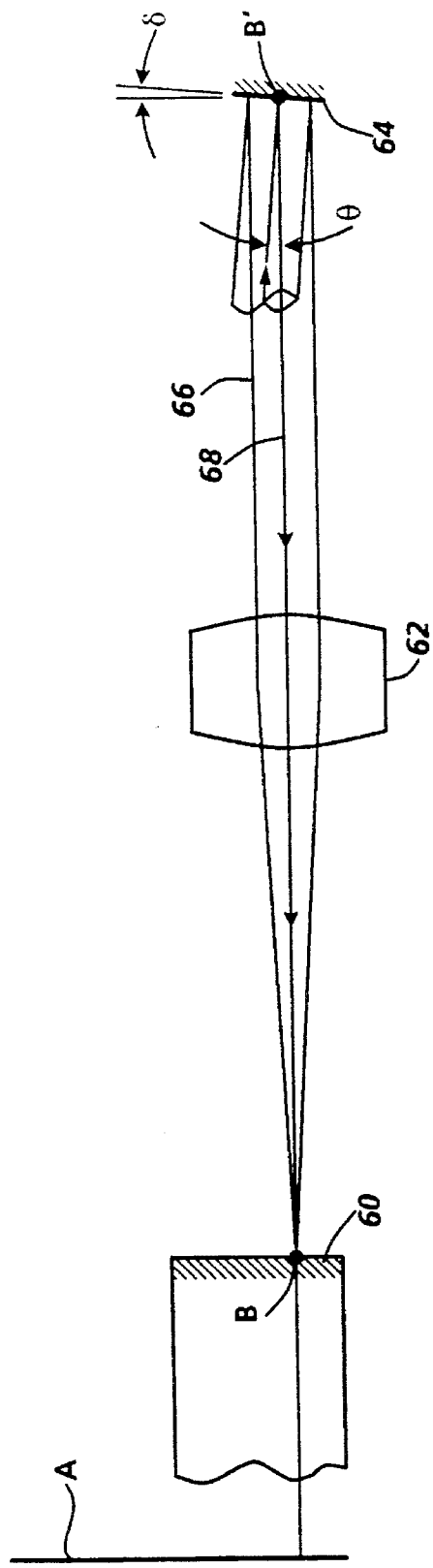
FIG. 14 shows a sagittal view of a passive scan angle doubling device shown in FIG. 13 after further propagation of the light beam.
Figure 15:
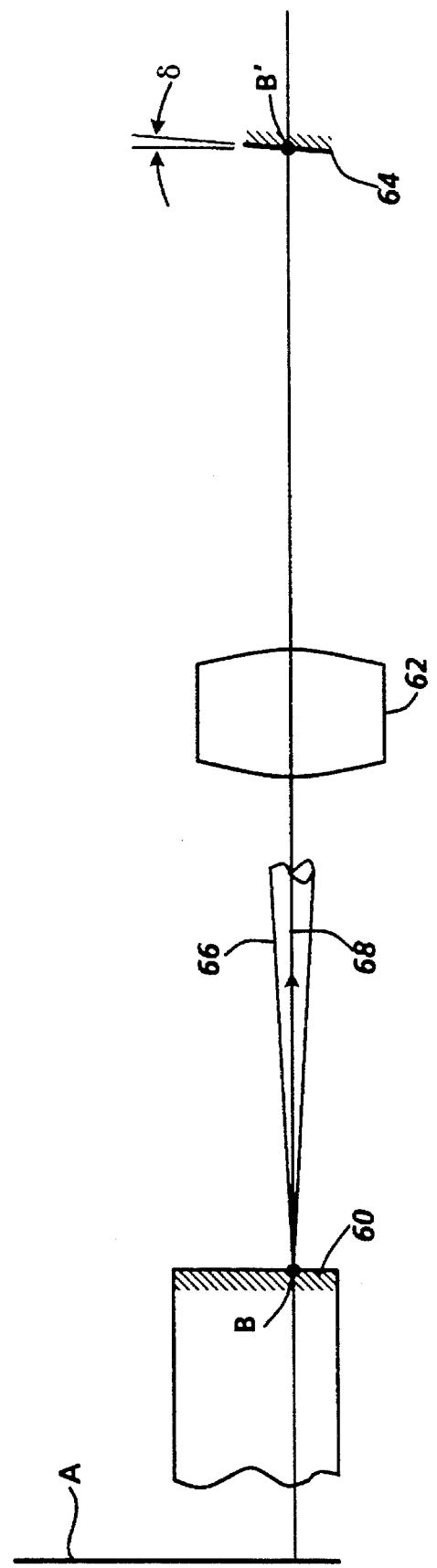
FIG. 15 shows a sagittal view of a passive scan angle doubling device shown in FIG. 14 after further propagation of the light beam.

FIGS. 13–15 show the same assembly shown in FIGS. 10–12 in a sagittal view rather than a tangential view and showing how the assembly can be used to preclude scan line bow. The flat facet 60 has a rotating polygon assembly axis A.

Scan line bow is caused when the light beam 66 is not perpendicular to the rotating polygon assembly axis A. FIGS. 13–15 show how an alteration to the cylinder mirror 64 can insure that the light beam 66 is perpendicular to the rotating polygon assembly axis A and therefore eliminate scan line bow.

As shown in FIG. 13, the light beam 66 from the light source is focussed upon the flat facet 60 in the sagittal plane. The light beam 66 is then reflected by the flat facet 60 as a diverging beam. After light beam 66 passes through the lens 62, which is an anamorphic lens of lower optical power in the sagittal plane, the light beam 66 travels towards the cylinder mirror 64 as a collimated beam in the sagittal plane.

As shown in FIG. 14, the light beam 66 is then reflected by the cylinder mirror 64 while maintaining its collimation. The light beam 66 then passes again through the lens 62 where it refocussed on the flat facet 60. It is this return trip that contributes to or eliminates scan line bow. If the light beam 66 is perpendicular to the mpa axis A on this return trip then scan line bow will be precluded.

To correct for scan line bow an angle ▌ between the the chief beam 68 of the light beam 66 and an optic axis B—B' between the cylinder mirror 64 and the rotating polygon assembly axis A and which is perpendicular to the mpa axis A must be implemented. To insure that the chief beam 68 is parallel to the optic axis B—B' and perpendicular to the MPA axis A, the cylinder mirror 64 must be tilted by an angle δ which is equal to ½ of the angle ▌ . When this is done, the light beam 66 will approach the flat facet 60 along the optic axis O and perpendicular to the MPA axis A as shown in FIG. 14.

The light beam 66 is reflected from the flat facet 60 for a second time as shown in FIG. 15. Any pyramidal error introduced into the light beam 66 in the first reflection from the flat facet 60, shown in FIG. 13, will be exactly cancelled when the light beam 66 is reflected from the flat facet 60 the second time, as shown in FIG. 15. This is because unlike the reflections in the tangential plane which add to each other, reflections in the sagittal plane cancel each other out.

The condition of focus on the flat facet 60 in the sagittal plane is required for optical wobble correction and is maintained throughout the two reflections.

Figure 16:
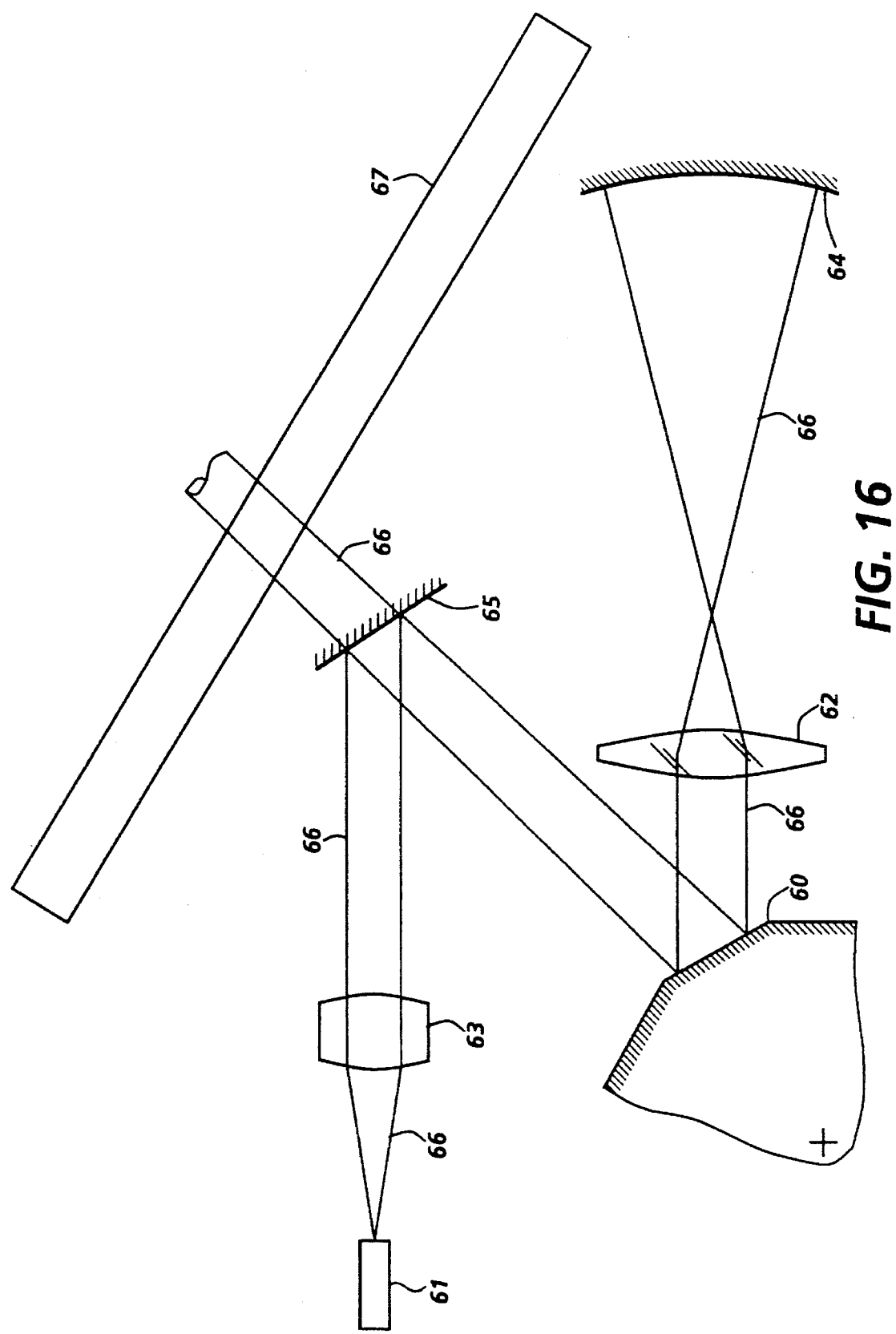
FIG. 16 shows a sagittal view of a passive scan angle doubling device shown in FIG. 9 used in a laser scanning system.

FIG. 16 shows the passive scan angle doubling system used in a scanning system including a light source 61, pre-polygon optics 63, a mirror 65 to direct the beam 66 towards the flat facet 60 and post scanning optics 67.

In FIGS. 7–15, the lens 62 is shown as a single element lens for illustrative purposes only to describe the concepts. In actual practice, the lens 62 may be a combination lens using one or more cylinder elements.

Figure 17:
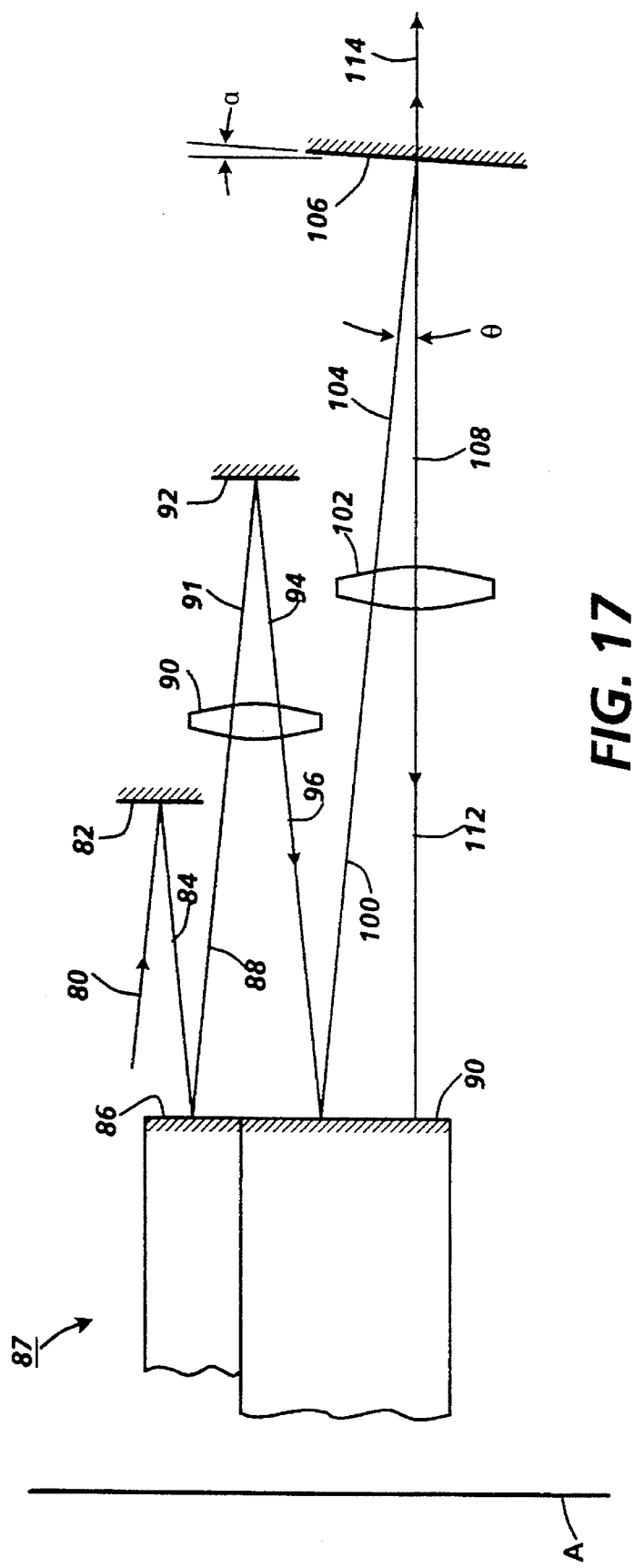
FIG. 17 shows a sagittal view of a system using both the passive facet tracking and scan angle doubling.
Figure 18:
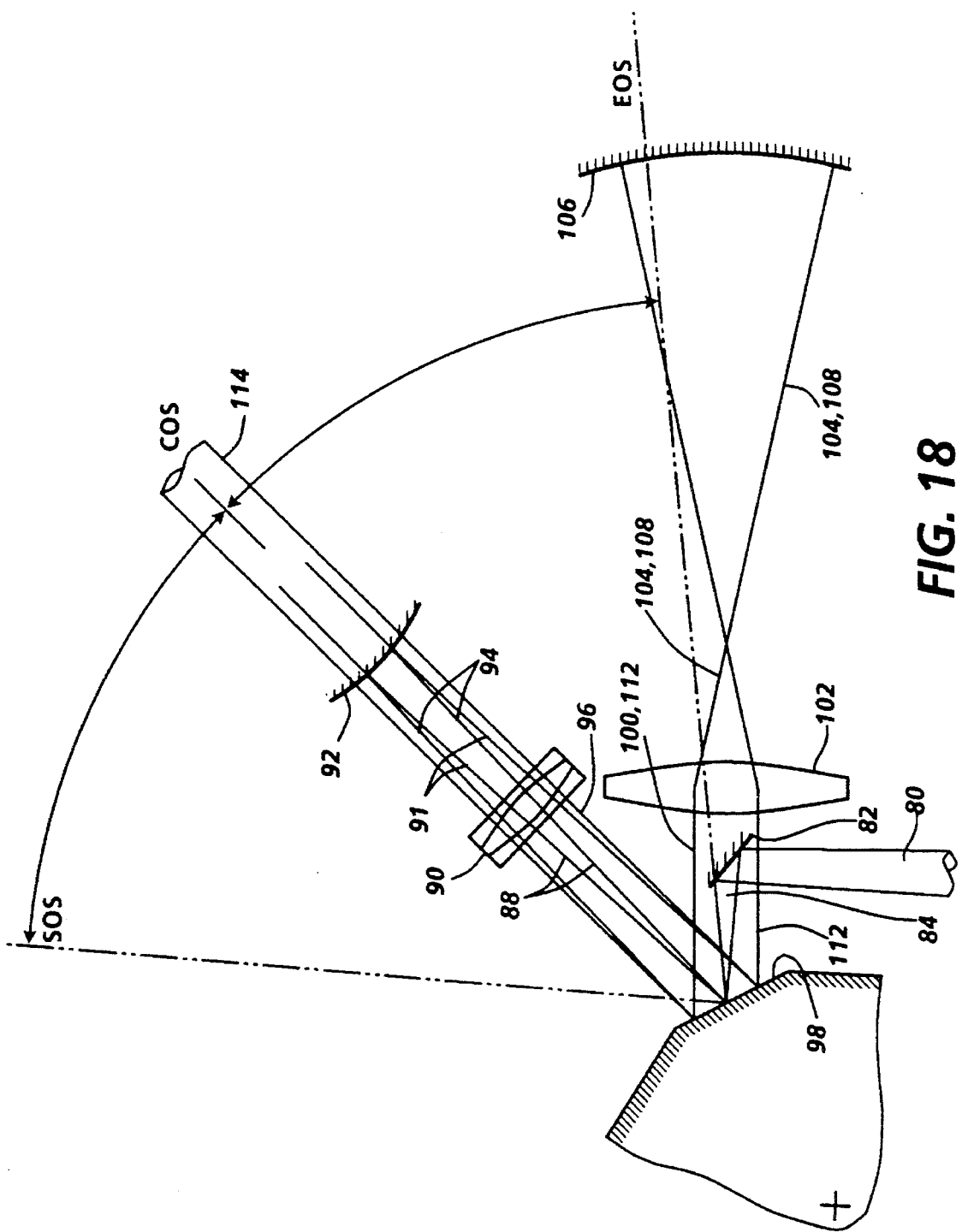
FIG. 18 shows a tangential view of a system using both the passive facet tracking and scan angle doubling.

The passive facet tracking and scan angle doubling devices described have been designed so that they may be used together in one system and still retain the desired optical characteristics of the light beam. FIGS. 17 and 18 show an implementation of a system using both the passive facet tracking and scan angle doubling earlier described.

The beam 80 first strikes a fold mirror 82. The beam 84 is then redirected by the fold mirror 82 and is focussed in the sagittal plane at the convex facets 86 of the dual mirror motor polygon assembly 87. When the beam 88 arrives at the passive facet tracking optics 90 from the dual mirror motor polygon assembly 87, the passive facet tracking optics 90 collimate the beam 91 in the tangential plane. The beam 91 is then retro reflected by the mirror 92. Upon arriving at the passive facet tracking optics 90 from the mirror 92, the beam 94 will be collimated in the tangential plane. It then continues on as beam 96 to the dual mirror motor polygon assembly 87 where it makes its first impact on the flat facet 98. The beam angles, mirror 92 and lens 90 act in the sagittal plane to both focus and displace the beam so that on its return to the dual mirror motor polygon assembly 87 the beam 96 arrives focussed on the flat facets 98. It is from the flat facets 98 that the beam 100 passes through the lens 102 and propagates towards the mirror 106 as beam 104. The beam 104 is then reflected by the mirror 106 as beam 108, and beam 108 passes through the lens 102 and beam 112 is returned to the flat facet 98 and reflected as beam 114. In a preferred embodiment beam collimation in the tangential plane is maintained at each impact with the falt facet. In the sagittal plane beam focus is required only at the fnal impact with the flat facet.

Beam 114 then propagates to post scanning optics and the scan line (not shown). With the beam 114 focussed in the sagittal plane, it is possible to include standard wobble correction optics in the post scanning optics. Additionally, the beam 112 returns to the dual mirror motor polygon assembly 87 at an angle that is normal to the flat facets 98. As the beam 112 is scanned by the dual mirror motor polygon assembly 87, it remains in this normal plane, essentially eliminating scan line bow.

Because beam collimation is maintained in the tangential plane at each impact of the flat facet, polygon manufacturing tolerances for facet-to-facet radius variations may be relaxed.

It should be noted that all optical elements are placed to avoid mechanical interferences. Whenever a drawing, in one view shows an apparent interference, looking at the structure with another view shows that the elements and beams are actually displaced from each other.

I claim:

1. A passive facet tracking scan angle doubling system comprising:
   A) a dual mirror rotating polygon having an axis of rotation and two facets, one facet located above the other in a direction which is along the axis of rotation, one of said facets being a flat facet and the other of said facets being a convex facet, the flat facet having an optic axis,
   B) a retro-reflector which has no power in a sagittal plane,
   C) a first lens means,
   D) a cylindrical mirror with a tangential plane radius of curvature and a center of the radius of curvature,
   E) a second lens means with a focal length and a focal point,
   F) said polygon, said first lens means, said retro-reflector, said cylindrical mirror, and second lens means being so constructed and arranged relative to each other for said polygon convex facet to reflect a beam along a first path through said first lens means to said retro-reflector, said retro-reflector receiving the beam reflected from said polygon convex facet and reflecting the beam through a second path through said first lens means to said polygon flat facet, and said polygon flat facet reflecting the beam received from said retro-reflector along a third path, at a first angle measured from the optic axis, through said second lens means to be received by said cylindrical mirror, said cylindrical mirror reflecting the received beam along a fourth path through said second lens means to be received by the flat facet, the flat facet reflecting said received beam in a post scan direction, at a second angle measured from the optic axis which is greater than the first angle,
   G) said first lens means being so constructed to partially collimate the beam, which has been focussed on said polygon convex facet, in a tangential plane after reflection from said polygon convex facet along the first path as the beam passes through said first lens means and to complete collimation of the beam in the tangential plane after reflection from said retro-reflector along the second path as it passes through said first lens means so that the beam is collimated in the tangential plane when it arrives at said polygon flat facet and to substantially collimate the beam, which has been focussed on said polygon convex facet, in the sagittal plane after reflection from said polygon convex facet along the first path as the beam passes through said first lens means and to focus the beam in the sagittal plane after reflection from said retro-reflector along the second path as it passes through said first lens means so that the beam is focussed in the sagittal plane when it arrives at the flat facet, and
   H) said polygon, cylindrical mirror, and second lens means being so arranged such that said rotating polygon and said cylindrical mirror are opposed to each other and separated by a distance greater than the sum of the radius of curvature plus the focal length, and said second lens means being interposed between said rotating polygon and said cylindrical mirror such that the center of the radius of curvature of said cylindrical mirror and the focal point of said second lens means are coincident.

2. The passive facet tracking scan angle doubling system of claim 1 wherein said retro-reflector is a is a cylindrical mirror.

3. The passive facet tracking scan angle doubling system of claim 1 wherein said first lens means is an anamorphic lens element.

4. The passive facet tracking scan angle doubling system of claim 1 wherein said first lens means is comprised of a single curved surface.

5. The passive facet tracking scan angle doubling system of claim 1 wherein said rotating polygon, said cylindrical mirror and said second focussing lens means are further constructed and arranged to substantially maintain beam collimation in the tangential plane whenever the beam is reflected from the reflective facet of said rotating polygon.

6. The passive facet tracking scan angle doubling system of claim 1 wherein said second focussing lens means is a combination lens.

7. The passive facet tracking scan angle doubling system of claim 6 wherein the combination lens uses at least one cylindrical element.

8. The passive facet tracking scan angle doubling system of claim 1 wherein the second angle is approximately twice the first angle.

9. A scanning sytem comprising:
   A) a light source for providing a light beam,
   B) a focussing lens means for focussing the light beam,
   C) post scan lens means,
   D) a scanning medium,
   E) passive facet tracking scan angle doubling means comprising:
      i) a dual mirror rotating polygon having an axis of rotation and two facets, one facet located above the other in a direction which is along the axis of rotation, one of said facets being a flat facet and the other of said facets being a convex facet, the flat facet having an optic axis, ii) a retro-reflector which has no power in a sagittal plane, iii) a first lens means, iv) a cylindrical mirror with a tangential plane radius of curvature and a center of the radius of curvature, v) a second lens means with a focal length and a focal point, vi) said polygon, said first lens means, said retro-reflector, said cylindrical mirror, and second lens means being so constructed and arranged relative to each other for said polygon convex facet to reflect a beam along a first path through said first lens means to said retro-reflector, said retro-reflector receiving the beam reflected from said polygon convex facet and reflecting the beam through a second path through said first lens means to said polygon flat facet, and said polygon flat facet reflecting the beam received from said retro-reflector along a third path, at a first angle measured from the optic axis, through said second lens means to be received by said cylindrical mirror, said cylindrical mirror reflecting the received beam along a fourth path through said second lens means to be received by the flat facet, the flat facet reflecting said received beam in a post scan direction, at a second angle measured from the optic axis which is greater than the first angle, vii) said first lens means being so constructed to partially collimate the beam, which has been focussed on said polygon convex facet, in a tangential plane after reflection from said polygon convex facet along the first path as the beam passes through said first lens means and to complete collimation of the beam in the tangential plane after reflection from said retro-reflector along the second path as it passes through said first lens means so that the beam is collimated in the tangential plane when it arrives at said polygon flat facet and to substantially collimate the beam, which has been focussed on said polygon convex facet in the sagittal plane after reflection from said polygon convex facet along the first path as the beam passes through said first lens means and to focus the beam in the sagittal plane after reflection from said retro-reflector along the second path as it passes through said first lens means so that the beam is focussed in the sagittal plane when it arrives at the flat facet, and viii) said polygon, cylindrical mirror, and second lens means being so arranged such that said rotating polygon and said cylindrical mirror are opposed to each other and separated by a distance greater than the sum of the radius of curvature plus the focal length, and said second lens means being interposed between said rotating polygon and said cylindrical mirror such that the center of the radius of curvature of said cylindrical mirror and the focal point of said second lens means are coincident.

F) said light source, focussing lens means, and scan angle doubling means so constructed and arranged relative to each other such that the light beam from the light source passes through said first focussing lens means and becomes focussed on the reflective facet, and G) said scan angle doubling means, post scan lens means, and scanning medium so constructed and arranged such that the beam reflected in the post scan direction passes through said post scan lens means and is received by said scanning medium.

10. The scanning system of claim 9 wherein said retro-reflector is a is a cylindrical mirror.

11. The scanning system of claim 9 wherein said first lens means is comprised of an anamorphic lens element.

12. The scanning system of claim 9 wherein said first lens means is comprised of a single curved surface.

13. The scanning system of claim 9 wherein said rotating polygon, said cylindrical mirror and said second focussing lens means are further constructed and arranged to substantially maintain beam collimation whenever the beam is reflected from the reflective facet of said rotating polygon.

14. The scanning system of claim 9 wherein said second focussing lens means is a combination lens.

15. The scanning system of claim 14 wherein the combination lens uses at least one cylindrical element.

16. The scanning system of claim 9 wherein the second angle is approximately twice the first angle.

* * * * *